(12) United States Patent
Deisinger et al.

(10) Patent No.: US 11,226,011 B2
(45) Date of Patent: Jan. 18, 2022

(54) BELLOWS COMPRISING AT LEAST ONE INTERNAL GROOVE

(71) Applicant: GKN Driveline International GmbH, Lohmar (DE)

(72) Inventors: Markus Deisinger, Siegburg (DE); Joachim Wette, Hennef (DE)

(73) Assignee: GKN Driveline International GmbH, Lohmar (DE)

( * ) Notice: Subject to any disclaimer, the term of this patent is extended or adjusted under 35 U.S.C. 154(b) by 122 days.

(21) Appl. No.: 16/475,775

(22) PCT Filed: Jan. 11, 2017

(86) PCT No.: PCT/EP2017/050487
§ 371 (c)(1),
(2) Date: Jul. 3, 2019

(87) PCT Pub. No.: WO2018/130277
PCT Pub. Date: Jul. 19, 2018

(65) Prior Publication Data
US 2019/0353209 A1    Nov. 21, 2019

(51) Int. Cl.
*F16J 3/04* (2006.01)
*F16D 3/84* (2006.01)

(52) U.S. Cl.
CPC .............. *F16D 3/845* (2013.01); *F16J 3/042* (2013.01)

(58) Field of Classification Search
CPC ........ F16J 3/00; F16J 3/042; F16J 3/04; F16J 3/041; F16D 3/843; F16D 3/845

USPC .......................................................... 277/391
See application file for complete search history.

(56) References Cited

U.S. PATENT DOCUMENTS

| | | | |
|---|---|---|---|
| 3,688,523 A | 9/1972 | Lutz | |
| 6,547,669 B1 * | 4/2003 | Neviani | ................... F16J 3/042 464/175 |
| 7,056,219 B2 | 6/2006 | Toriumi et al. | |
| 7,326,119 B2 * | 2/2008 | Toriumi | ................... F16J 3/042 464/175 |
| 7,967,687 B2 | 6/2011 | Yamamoto | |

(Continued)

FOREIGN PATENT DOCUMENTS

| | | |
|---|---|---|
| CN | 101398081 A | 4/2009 |
| DE | 10131302 A1 | 1/2003 |

(Continued)

OTHER PUBLICATIONS

International Search Report and Written Opinion for PCT/EP2017/050487 dated Oct. 17, 2017 (16 pages; with English translation).

(Continued)

*Primary Examiner* — Nathan Cumar
(74) *Attorney, Agent, or Firm* — Bejin Bieneman PLC (57) ABSTRACT

A boot is provided with an improved sealing effect. The boot has a first and a second fastening region, and a pleated region between them, wherein the first fastening region comprises lobe regions and/or guide regions, and connecting regions and a connector seat region that has a connector seat region surface and an undersurface lying opposite it, wherein there is at least one inner groove in the lobe regions and/or in the guide regions, on the undersurface.

20 Claims, 5 Drawing Sheets

(56) References Cited

U.S. PATENT DOCUMENTS

| | | | |
|---|---|---|---|
| 2004/0036231 A1* | 2/2004 | Neviani | F16D 3/845 |
| | | | 277/634 |
| 2004/0056434 A1* | 3/2004 | Wolf | F16D 3/845 |
| | | | 277/634 |
| 2004/0164500 A1 | 8/2004 | Devers | |
| 2005/0026706 A1 | 2/2005 | Kashiwagi | |
| 2006/0125194 A1* | 6/2006 | Toriumi | F16J 3/042 |
| | | | 277/634 |

FOREIGN PATENT DOCUMENTS

| | | |
|---|---|---|
| DE | 10 2004 037715 A1 | 2/2006 |
| DE | 10348372 B4 | 6/2006 |
| EP | 1273834 A2 | 6/2002 |
| EP | 1182372 B1 | 12/2007 |
| EP | 2730795 A1 | 5/2014 |
| FR | 2572478 A1 | 5/1986 |
| JP | S56157465 U | 11/1981 |
| JP | S58182064 U | 12/1983 |
| JP | S6216541 Y2 | 4/1987 |
| JP | H08232971 A | 9/1996 |
| JP | H09196187 A | 7/1997 |
| JP | 200213546 A | 1/2002 |
| JP | 2002340013 A | 11/2002 |
| JP | 2004108435 A | 4/2004 |
| JP | 3572470 B2 | 10/2004 |
| JP | 2005036983 A | 2/2005 |
| JP | 2009068510 A | 4/2009 |
| JP | 2010025255 A | 2/2010 |
| JP | 2010127407 A | 6/2010 |
| JP | 201133065 A | 2/2011 |
| JP | 2013204685 A | 10/2013 |
| KR | 200258412 | 12/2001 |
| KR | 200258412 Y1 | 12/2001 |
| KR | 101336503 B1 | 12/2013 |

OTHER PUBLICATIONS

International Preliminary Report on Patentability for PCT/EP2017/050487 dated Oct. 30, 2018 (38 pages).
International Search Report and Written Opinion for PCT/EP2018/050179 dated May 14, 2018 (13 pages; with English translation).
Non-Final Office Action dated Dec. 2, 2021 for U.S. Appl. No. 16/475,772 (30 pages).

* cited by examiner

BELLOWS COMPRISING AT LEAST ONE INTERNAL GROOVE

CROSS-REFERENCE TO RELATED APPLICATIONS

This application is a national stage of, and claims priority to, Patent Cooperation Treaty Application No. PCT/EP2017/050487, filed on Jan. 11, 2017, which application is hereby incorporated herein by reference in its entirety.

BACKGROUND

Boots of the generic type are used for sealing joint components, in particular in the drive trains of motor vehicles and utility vehicles of any type. Joints in the form of constant-velocity joints typically have three radial recesses on their exterior circumference in the prior art. The outer contour formed in this manner is referred to as having three lobes, and these joints are referred to in general as tri-lobe constant-velocity joints. The object of the boot is to seal the joint region in order to prevent contaminants and moisture from entering the joint, and to prevent grease from escaping.

The sealing effect is also obtained in that the tri-lobe outer contour of the joint housing is formed in the connection region of a boot by providing a thicker material at the corresponding locations. The bulges formed in this manner compensate for the differences in radii in the tri-lobe outer contour of the joint housing when a fastening region is provided that has a constant radius, such that fastening elements such as clamps or tension straps, connectors in general, can be used therewith.

A generic boot is known from EP 1 182 372 B1 that has at least one slot in tri-lobe regions of the fastening region of the fastening means facing a joint housing, which has a circumferential length, and a radial depth that extends substantially through the entire material of the associated tri-lobe region, such that the tri-lobe region is not robust, wherein the at least one slot of the tri-lobe region extends over the circumference of the boot at a spacing to at least one further slot in an adjacent tri-lobe region.

The disadvantage with this known boot from the prior art is that, due to the bulky design of the fastening region, the connector tends to crack when it is fastened in place, or the seal may fail where the boot borders on a circumferential groove on the outside of the joint housing. If there are numerous parallel slots in the tri-lobe regions as described in EP 1 182 372 B1, an exposed rib is formed between them, which tends to bend when a connector is put in place and fastened, if the material is too soft, or, if the material is too hard, may break the connector when fastening it.

BRIEF SUMMARY

The present disclosure relates to a boot that has a first fastening region and a second fastening region, and a pleated region between them, wherein the first fastening region comprises lobe regions and/or guide regions and connecting regions and a connector seat region, and a use of the boot according to the disclosure as well as a joint-shaft connection that comprises the boot. The boot can be placed on a joint housing that has a tri-lobe outer contour, and which avoids the problems known from the prior art.

In a boot as disclosed herein the first fastening region still comprises a connector seat region that has a connector seat region surface and an undersurface opposite thereof, wherein there is at least one inner groove in the undersurface, in the regions of the lobes and/or the guide regions. If there is more than one inner groove in the undersurface, these inner grooves are substantially parallel to one another. It is possible that there is exactly one groove in the undersurface.

It has been determined that by providing at least one inner groove on the undersurface of the first connector seat region in the lobe regions and/or in the guide regions, breakage problems, as well as sealing problems in connectors that are inserted therein are advantageously avoided. The at least one inner groove can be located in the lobe regions and/or guide regions on the undersurface of the first connector seat region. The at least one inner groove is also possibly not located in the connecting regions. In an example of the boot according to the disclosure, the undersurface of the first fastening region thus has inner grooves in the form of groove segments in the lobe regions and/or the guide regions, wherein it is further possible that there is precisely one inner groove in each lobe region and/or each guide region. The at least one inner groove thus does not form a circumferential groove, in the manner of an annular groove, on the undersurface of the first fastening region. If the at least one inner groove, comprised of groove segments, is only formed in the lobe regions and/or the guide regions, possibly in both regions, the individual groove segments of the at least one inner groove run in a common plane, which passes through an inner groove base of the at least one groove, i.e., the individual groove segments of the at least one inner groove are formed successively along the circumference of the first connector seat region. If these groove segments of the at least one inner groove are connected to one another via the connecting regions, an annular circumferential inner groove is formed, as is the case in an alternative example of the present disclosure. The inner groove can have a different cross section shape in the connecting regions than in the lobe regions and/or the guide regions.

Boots according to the disclosure can have three lobe regions, for example, and three connecting regions that connect them. There can also be three lobe regions and three guide regions, which are connected to one another via six connecting regions.

The lobe regions of the first fastening region of the boot according to the disclosure have the material reinforcements on the inner surface thereof, with a radial contour that is adapted to the recesses (radial indentations) formed on the tri-lobe joint housing, which run toward a shaft. The guide regions also have material reinforcements on the inner surface of the first fastening region facing the joint housing, but these reinforcements have a linear contour. There can be at least one inner groove in just the lobe regions in an example, and in another preferred example there can be at least one inner groove in the lobe regions and the guide regions, and it is further possible that there is precisely one inner groove in each. Alternatively, there can be at least one, possibly precisely one, inner groove in just the guide regions. The first fastening region has a thinner, possibly constant, material thickness in the connecting regions than in the lobe regions and/or the guide regions.

The pleated region of the boot according to the disclosure can have at least one pleat, which has a pleat crest and a pleat trough facing the first fastening region and a pleat trough facing the second fastening region, wherein there is typically at least one further pleat following the pleat trough facing the second fastening region. The pleated region can have a number of pleats, e.g., two, three, four, five, six, seven, eight, or more. The pleats in the pleated region can have diameters that decrease from the first connector seat region to the second connector seat region, and they may have sections with the same diameter. By way of example, there can be one to three pleats with decreasing diameters toward the second connector seat region with respect to the pleat peaks thereof, followed by two to four pleats with the same diameter with respect to the pleat peaks, after which there are one to three pleats with diameters that decrease toward the second fastening region with respect to their pleat peaks. Any other configuration of the pleated region is also possible. The pleat troughs can be in any form, e.g., they can be subdivided by material reinforcements or reductions in material in order to modify the flexibility of the boot with regard to special requirements for the boot.

In an example, a material thickness S1 for the first fastening region is determined between the connector seat region surface and a groove base in the at least one inner groove, which has a substantially constant thickness in the lobe regions and/or in the guide regions. "Substantially" means that the respective material thicknesses in the lobe regions and/or the guide regions deviate from one another no more than approximately ±20%, possibly no more than approximately ±10%, and further possibly no more than approximately ±2%, in particular with respect to material thicknesses. In this advantageous example, the material of the first fastening region above the at least one inner groove advantageously behaves substantially the same in the lobe regions and/or the guide regions when subjected to forces by closing a connector, i.e., a homogenous behavior can be obtained in the lobe regions and/or the guide regions, which have a greater material thickness than the connecting regions.

The at least one inner groove can be located in the middle of the undersurface of the first fastening region in a cross section through the first connector seat region, wherein the cross section is defined by a plane that comprises the main axis of the boot according to the disclosure, and passes through the first fastening region and the second fastening region. If there are more than at least one inner groove, when there is an odd number of grooves, preferably one of the inner grooves is likewise approximately in the middle, as described above. If there is an even number of inner grooves, the even number of grooves can be distributed evenly over the undersurface of the first fastening region, wherein these can be distributed symmetrically in relation to a plane dividing the first fastening region, perpendicular to the aforementioned cross section, on the undersurface thereof.

In a further possible example, there are at least two substantially parallel outer grooves in the lobe regions and/or the guide regions, starting from the connector seat surface.

The at least two outer grooves can be substantially parallel to one another, and are also preferably approximately the same length in the lobe regions and/or guide regions, such that they do not form circumferential annular grooves. As set forth in the present disclosure, there can be not only two, but three, four, or more such outer grooves. The at least two outer grooves have a parabolic cross section in this case, and possibly all of the outer grooves located in the connector seat region of the first fastening region, which are located there starting from the connector seat region surface, i.e., such that they are open toward the connector seat region surface of the connector seat region in the first fastening region, have a parabolic cross section in the lobe regions and in the guide regions.

As a result of the at least two outer grooves, forces acting on the first connector seat region are advantageously transferred evenly, supported in particular by a design in which these outer grooves approach one another, as is described in greater detail below. Because there are at least two outer grooves, the material thickness is more evenly distributed inside the first connector seat region in the lobe regions and/or the guide regions, which can ultimately prevent the connectors from breaking when they are fastened in place. The boot can also be formed without outer grooves, such that it only has at least one inner groove, preferably precisely one inner groove. In an example of the boot, there is one inner groove in the lobe regions, and at least two outer grooves. In another example, the guide regions also have an inner groove added to the aforementioned example. There are no outer grooves in two alternative examples to the two examples above.

In another example, the at least one inner groove and/or the at least two outer grooves have a substantially parabolic cross section, as defined above, that passes through a plane running through the main axis of the boot and through the first fastening region and the second fastening region. If the at least one inner groove and/or the at least two outer grooves are annular grooves, they can also be substantially parabolic in the connecting regions.

Parabolic grooves as set forth in the present disclosure are grooves that have a parabolic cross section in the mathematical sense, defined by a plane that runs along the first and second connecting regions, and through a central axis of the boot. This means that the shape of the grooves in the boot is characterized as a section of a straight circular cone in a plane that is parallel to a surface line and does not intersect the tip of the cone. The grooves in the boot according to the disclosure have a radial inner wall. The opposing walls of the inner wall are substantially mirror symmetrical with respect to a plane that is perpendicular to the aforementioned plane, running though the base of the grooves. The groove base itself is not flat, but instead exhibits only radial sections. In particular, the groove base contains no regions that are substantially parallel to the connector seat region surface and the opposing undersurface of the first fastening region. The exception is a tangent to the bases of the grooves. Because of the parabolic design of the at least one inner groove and/or the at least two outer grooves, not only is a more uniform distribution of forces acting thereon due to the connection of a connector thereto obtained, but the material located between two such inner grooves and/or outer grooves, which can be described as having a rib-like shape, is prevented from bending outward, or even breaking off, when the connector is fastened thereto.

The material of the connector seat region located between the at least two outer grooves particularly can have a thickness $D_a$ at half the depth of the outer grooves in the lobe regions and/or the guide regions that corresponds to approximately 85% to 115%, or approximately 90% to 110%, and further possibly approximately 93% to 106% of a thickness $D_b$ determined between an outer wall and an inner wall of the first connector seat region and the groove wall facing it on the at least two outer grooves adjacent to the outer wall and the inner wall, at half the depth.

A substantially constant material thickness in the regions at half the depth results in a homogenous distribution of force when fastening a connector thereto, and also prevents a possible bending away of the material located between two outer grooves, as is known. The parabolic design of the outer grooves and inner grooves also contributes to this. The material between two grooves is distributed in the region of the groove bases starting from the connector seat region surface or the undersurface of the first connector seat region. This material can be referred to as having a ribbed design.

In another preferred example, the at least one inner groove and/or the at least two outer grooves have different depths T in the lobe regions and/or in the guide regions. The depth of the at least one inner groove and/or the at least two outer grooves can increase toward the middle of the lobe regions and/or the guide regions.

Different or varying depths with respect to the at least one inner groove and the at least two outer grooves is understood to mean, as set forth in the present disclosure, that the depth of a groove increases inside the lobe regions and/or the guide regions from an end of a lobe region or a guide region to the middle of the lobe region or the guide region, and then decreases again, seen along the circumference of the first fastening region. As a result of the different depths, in particular in a design of the at least one inner groove and/or the at least two outer grooves described above, the material thickness of the first fastening region below the at least two outer grooves or above the at least one inner groove remains substantially constant with respect to the groove base thereof, in particular with uniform design thereof, such that the forces acting thereon through the connection of the connector to the first fastening region can be evenly transferred.

In another example of the boot, there is at least one reinforcement rib in the at least one inner groove and/or the at least two outer grooves, possibly precisely one reinforcement rib in each case. These reinforcement ribs are used to stabilize the material in the first fastening region because of the greater depths of the at least two grooves in the lobe regions in particular. As a result, the material between the at least two outer grooves or between the inner grooves and outer grooves, which is ribbed in particular, is prevented specifically from bending. The reinforcement ribs can engage in the opposing groove walls, and can be connected thereto in an integral manner. The height of the reinforcement ribs is also possibly no greater than the depths of the respective grooves. The reinforcement ribs can extend from the groove base to the connector seat region surface, or the undersurface, but they can also end somewhat below the connector seat region surface or the undersurface, or its surface. In an example, at least one of the reinforcement ribs has a radial orientation. A radial orientation means that these reinforcement ribs are substantially straight, running from the first fastening region in the direction of an imaginary central axis of the boot. In another example, at least one of the reinforcement ribs runs at an angle to a radial orientation. This means that a line passing through this other angled reinforcement rib, which is straight, does not pass through the center of the boot, through which the imaginary main axis of the boot runs. The boot can have at least two reinforcement ribs that have a radial orientation, wherein one radial reinforcement rib can be located in a lobe region and another reinforcement rib can be located in a guide region, wherein it is also possible that the lobe region and the guide region with the radial reinforcement ribs lie opposite one another. The above design preferably applies to both the at least one inner groove as well as to the at least two outer grooves, which also preferably do not intersect in the straight extensions thereof, but instead have designs that differ from one another. As a result, the opposing lobe regions and guide regions can have identical pairs of angles. The angles can be in a range of approximately 35° to 80°, more preferably in a region of approximately 40° to 78°, with respect to a radial that connects the imaginary main axis passing through the center of the boot to the first fastening region by the shortest path.

In another example, the at least one inner groove and/or the at least two outer grooves form annular grooves. The annular grooves can be not very deep in the connecting regions. The grooves can have a constant, i.e. unvarying, depth there. In an example, the at least one inner groove, precisely one inner groove, is located in each of the lobe regions, and if there are any, in each of the guide regions, or only in the lobe regions, and the at least two outer grooves, preferably precisely two outer grooves, form annular grooves. In an alternative example, the at least one inner groove, precisely one inner groove, as well as the at least two outer grooves, precisely two outer grooves, are only located in each of the lobe regions, and if there are any, in each of the guide regions, or only in the lobe regions. In another alternative example, the boot according to the disclosure has only an inner groove, which is located in each of the lobe regions, and if there are any, in each of the guide regions, or just in the lobe regions, but has no outer grooves. If the at least one inner groove and/or the at least two outer grooves are only formed in lobe regions and/or guide regions, and thus do not form annular grooves, the explanations above apply, specifically that the combined individual associated groove segments are defined as at least one inner groove, or at least two outer grooves, as set forth in the present disclosure. The respective segments of the at least one inner groove, or the at least two outer grooves are on a common plane running through the groove bases, i.e., they are arranged successively, seen along the circumference of the fastening region, interrupted by the connecting sections.

In another example, the at least one inner groove on the undersurface of the first fastening region is located between the at least two outer grooves, starting from the connector seat region surface, in a cross section as defined above. If there is precisely one inner groove, it is located substantially in the middle of the connector seat region, as described above, with respect to the cross section of the first fastening region defined above. It is also possible that the at least two outer grooves, preferably precisely two outer grooves, are then located on both sides of the inner groove with respect to the cross section of the connector seat region defined above, wherein the respective groove bases can be not located opposite one another, or are located in a region of a base of the respective groove, defined by the opening thereof toward the connector seat region surface or toward the undersurface.

In another example, the thickness S2 of the material in the first fastening region beneath the at least two outer grooves in the lobe regions and/or in the guide regions is substantially uniform between the groove bases thereof and the undersurface of the first fastening region. In this case, that which was stated above with regard to the definition of "substantially" in the context of the at least one inner groove regarding the material thickness S1, also applies. A homogenous behavior can be obtained with this possible example in the lobe regions and/or the guide regions, both of which have a greater material thickness than the connecting regions, due to the resulting forces acting thereon when closing a connector.

In another example, there are two sealing lips on the undersurface of the first fastening region. Possibly, there are at least three, at least four, at least five, at least six, or more, sealing lips. The sealing lips can form circumferential annular lips. The sealing lips are substantially parallel to one another. The sealing lips also can have a substantially identical cross section seen along a plane passing through the main axis of the boot, which connects the first fastening region and the second fastening region. The cross section is particularly preferably triangular, but can also be semicircular, or have other radial regions. If the cross section is basically triangular, the apex of the triangle, which is oriented toward an imaginary surface of a joint groove, is somewhat rounded. Adjacent sealing lips are substantially the same height, starting from the undersurface of the first fastening region.

In an example, the sealing lips are substantially located inside the region defined by the at least two outer grooves in the lobe regions and the guide regions. This region defined by the outer grooves is defined by that width of the connector seat region surface that extends from the groove wall adjacent to an outer wall of the first fastening region to the groove wall of the subsequent outer groove facing an inner wall of the first fastening region. The sealing lips can be located precisely beneath a groove base of one of the outer grooves, or they can be offset in pairs along the circumference, on both sides of the groove base. Sealing lips, preferably precisely one, can also be provided in the region between two outer grooves where material is accumulated, typically in the form of ribs, in particular if there are more than two outer grooves.

In another example, two positioning ribs are located in the connecting regions of the first fastening region, on its undersurface. The at least two sealing lips can be located between the positioning ribs. The two positioning ribs can be spaced apart at a distance that corresponds substantially to the joint groove on a joint housing on which the boot according to the disclosure is located. The two positioning ribs can be located exclusively in the connecting regions. These also can have a length that substantially corresponds to a radial extension of the guide region, or is slightly shorter than this radial extension. As a result of the two positioning ribs, which encompass both of sealing lips on both sides in a cross section that passes through the imaginary main axis of the boot according to the disclosure, and comprises a plane between the first fastening region and the second fastening region, further positioning aids, which are often provided in the transition from the first fastening region to the pleated region, become superfluous. Advantageously, a first pleat in the pleated region, which is adjacent to the first fastening region, can have a greater diameter with respect to the crest of the pleat.

The cross section profiles of the sealing lips also can differ from those of the positioning ribs. The cross section profile is in relation to a plane running through the first fastening region and the second fastening region, which intersects the imaginary main axis of the boot according to the disclosure. In differing from the cross section profile described above, the positioning ribs can have a substantially triangular shape. The base of the triangle, which is located on the undersurface of the first fastening region, can be wider than the base of the sealing lips. The height of the positioning ribs also can be somewhat less than the height of the sealing lips. The positioning ribs can be located outside the region defined by the at least two grooves, and are therefore not beneath them, as is the case with the sealing lips.

Insofar as the term "approximately" is used with regard to values, value ranges, or terms referring to values, this is to be understood to mean that which a person skilled in the art would regard as typical from a professional perspective in the given context. In particular, deviations from the given value, range of values, or terms referring to values, of ±10%, preferably ±5%, more preferably ±2%, are comprised in the term "approximately."

The present disclosure also relates to a boot of the type specified in the above, in which there are two positioning ribs located in the connecting regions, between which at least two sealing lips are located, which encompass an undersurface of the first fastening region. The two positioning ribs are advantageously designed in the manner described above. In other examples of such an alternative boot, they exhibit one of the other designs described above, i.e., that with an inner groove and/or at least two outer grooves in at least the lobe regions and/or the guide regions, and those designs associated therewith, as well as those for the first connector seat region. This alternative boot also can comprise the at least two sealing lips, as described above.

The present disclosure also relates to the use of a boot according to the disclosure, as defined above, for sealing a joint-shaft connection, preferably a constant-velocity joint. The present disclosure also relates to a joint-shaft connection that has a boot according to the disclosure, as described above. The joint-shaft connection can be a constant-velocity joint. The boot can be pre-assembled thereon, wherein the connector, which is already located in the first fastening region, is not yet tightened down. The inner contour of the boot can be adapted to the outer contour of the joint housing in the joint-shaft connection. The first region of the boot interacts in particular with a circumferential joint groove on the outside of the joint housing located in the proximity of the edge of the joint housing.

BRIEF SUMMARY OF THE DRAWINGS

These and other advantages shall be explained below in greater detail based on the following figures. Therein.

DESCRIPTION

It should first be noted that the examples shown in the figures are not to be regarded as limiting. On the contrary, the features described in reference thereto can be combined with one another and with previously described features to obtain further designs. By way of example, there can also be more than two sealing lips 62.1 and 62.2 on an inner surface 40 of a first fastening region 12 in the first example of the boot 10 according to FIG. 1. There can also be no, or more than two, parabolic outer grooves 52 and 54 and more than one parabolic inner groove 70, e.g. three or four. The parabolic form of the outer grooves 52 and 54 and the inner groove 70 can also differ from that shown in the figures. There can also be no circumferential outer grooves 52 and 54, i.e. annular grooves, and instead the outer grooves 52 and 54 can be interrupted in the connecting regions 34, such that they are each composed of three or six groove segments. The groove segments of the grooves 52 and 54 are then only located in the lobe regions 30 and the guide regions 32, or just in the lobe regions 30. Moreover, there may be no guide regions 32, such that there are, e.g., three lobe regions 30 and three connecting regions 34. The boot 10 can also have more or fewer pleats 18 in its pleated region, or it can have pleats 18 with a different shape. Furthermore, there do not need to be any positioning ribs 64.1 and 64.2. Lastly, it should be noted that the reference symbols used in the descriptions of the figures and in the claims do not limit the scope of protection of the present invention, but only refer to the examples shown in the figures.

Figure 1:
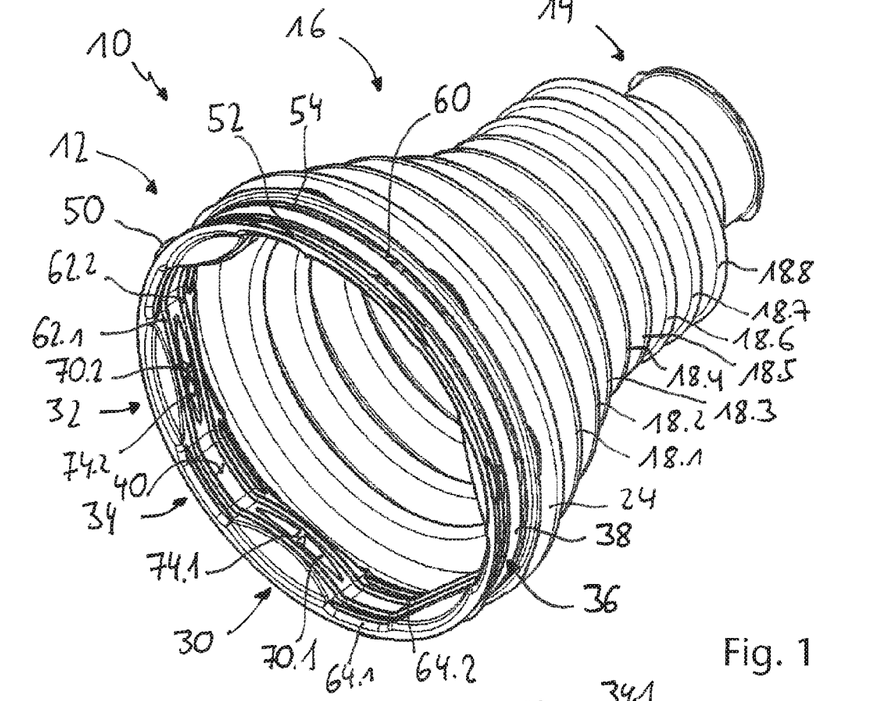
FIG. 1: shows a perspective view of a first example of a boot.

FIG. 1 shows a first and sole example of a boot, indicated as a whole with the reference symbol 10, which is shown in the figures, which has a first fastening region 12, and a second fastening region 14, and pleated region 16 between them, which has a total of 8 pleats 18.1 to 18.8. There is a transition region 24 between the first fastening region 12 and the first pleat 18.1.

Figure 2:
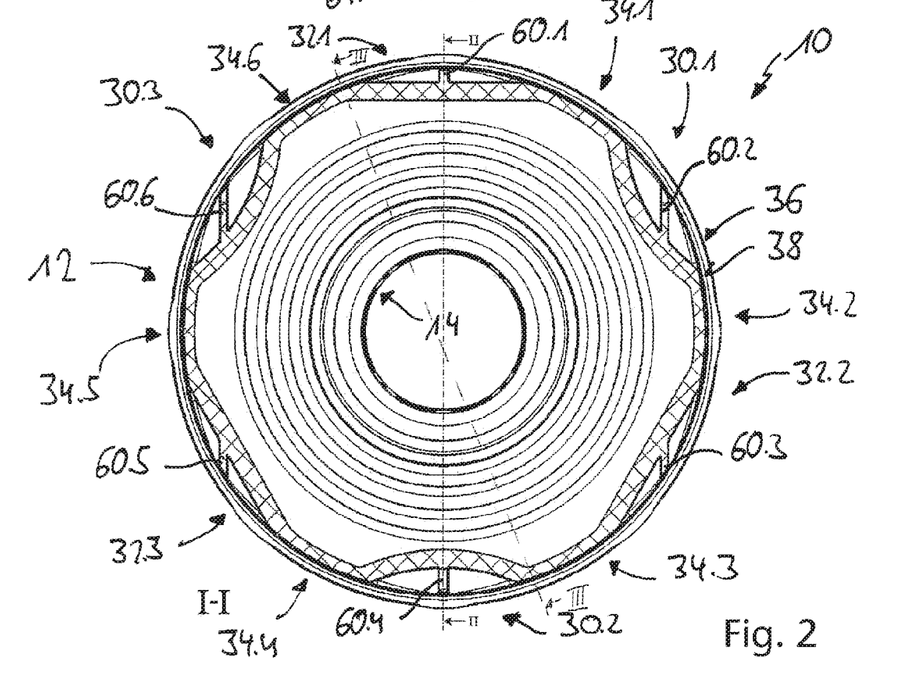
FIG. 2: shows a sectional view cut along a section I-I shown in FIG. 6.

The first fastening region 12 has a connector seat region 36 with a connector seat region surface 38, starting from which there are two circumferential annular outer grooves 52 and 54. The first connector seat region 12 has lug-shaped projections 50 on each side of the connector seat region 36, which simplify the fastening of a connector, not shown herein. The fastening region 12 also has three lobe regions 30 and three guide regions 32, as well as six connecting regions 34 located between lobe regions 30 and guide regions 32. The lobe regions 30 are placed in radial recesses in a tri-lobed outer part of the joint that has a corresponding design, not shown herein, and these lobe regions are shaped to fit in these recesses in the outer part of the joint. This applies accordingly to the guide regions 32 that have a straight outer contour oriented toward the interior of the boot 10, and also to the connecting regions 34, accordingly. Positioning ribs 64.1 and 64.2 can be seen in the connecting regions 34, between which there are two circumferential, annular sealing lips 62.1 and 62.2. There is precisely one reinforcement rib 74.1 in each of the lobe regions 30, and precisely one reinforcement rib 74.2 in each of the guide regions 32. These ribs have a radial orientation. Another orientation, e.g. at an angle, as described below regarding the reinforcement ribs 60.1 to 60.2 in reference to FIG. 2, is also possible. In an example of the disclosure, all of the reinforcement ribs in the at least one inner groove have a radial orientation. Preferably, there is ideally precisely one reinforcement rib located in the at least one inner groove in each of the lobe regions and/or the guide regions. Reinforcement ribs 60 can also be seen in FIG. 1, which are located in the outer grooves 52 and 54. The reinforcement ribs 74.1 and 74.2 are located in an inner groove comprised of groove segments 70.1 and 70.2, which does not form an annular groove. These groove segments 70.1 and 70.2 of the inner groove lie in a common plane that connects the bases of these groove segments to one another, and are arranged successively on the inner circumference of an inner surface 40 of the first fastening region 12.

Figure 6:
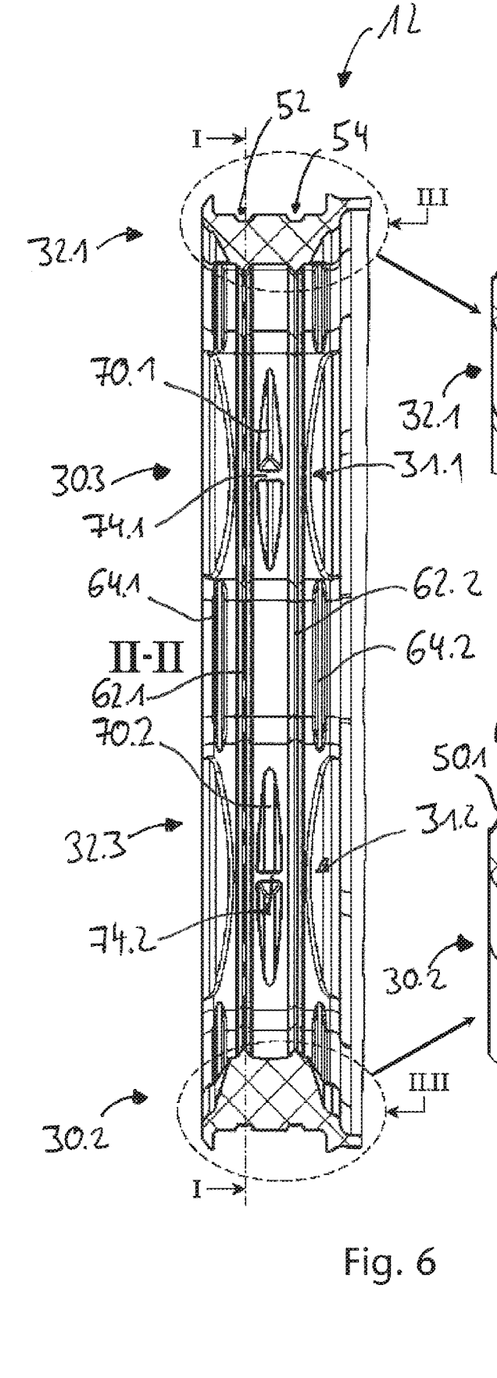
FIG. 6: shows a sectional view cut along the section II-II shown in FIG. 2.

FIG. 2 shows a section I-I indicated in FIG. 6, wherein FIG. 6 shows a section II-II indicated in FIG. 2. The section I-I passes through the groove base of the one outer groove 52. It can be readily derived from FIG. 2 that the material in the first fastening region 12 in the connecting regions 34.1 to 34.6 is not as thick, and that the lobe regions 30.1 to 30.3 as well as the guide regions 32.1 to 32.2 are basically the same thickness. Reinforcement ribs 60.1 to 60.6 can also be seen. The reinforcement rib 60.1 in the guide region 32.1 and the reinforcement rib 60.4 in the lobe region 30.2 have a radial orientation, and the guide region 32.1 and the lobe region 30.2 are formed opposite one another. The other reinforcement ribs 60.2, 60.3, 60.5 and 60.6 are formed at an angle to a radial orientation. The reinforcement ribs 60.1 and 60.2 dedicated to the lobe regions 30.1 and 30.3 are longer than the reinforcement ribs 60.3 and 60.5 in the guide sections 32.2 and 32.3. The adjacent pairs of reinforcement ribs 60.2, 60.3, and 60.5, 60.6 do not lie on a common line, but instead are at different angles to one another.

Figure 3:
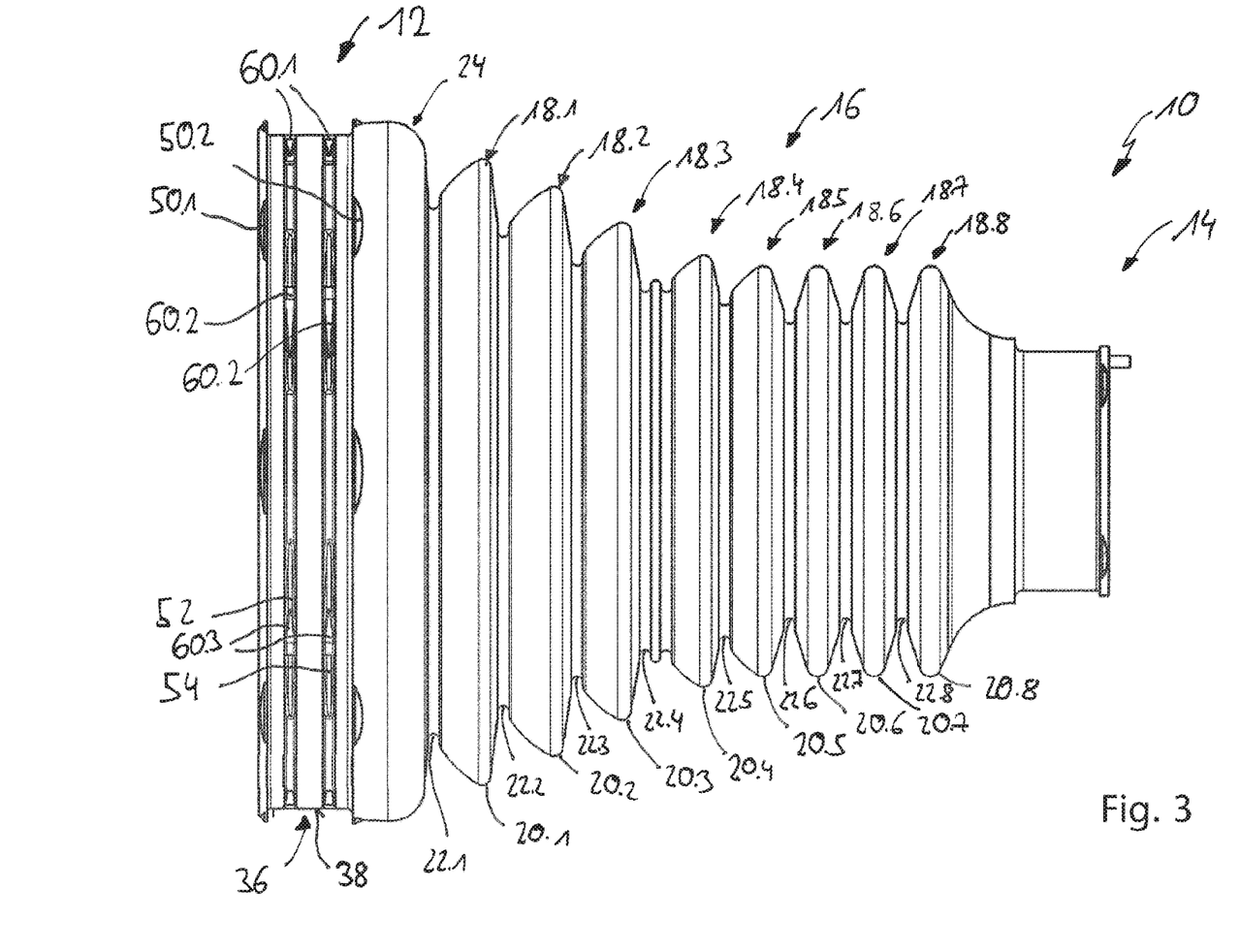
FIG. 3: shows a side view of the first example of the boot.

The design of the pleated region 16, which contains the pleats 18.1 to 18.8, can be readily seen in FIG. 3 in particular. The pleats 18.1 to 18.8 have pleat crests 20.1 to 20.8. The pleated region 16 also has pleat troughs 22.1 to 22.8. The diameter of the pleats 18.1 to 18.4 decreases toward the second fastening region 14, while the pleats 18.5 to 18.8 in contrast, basically have the same diameter. A material accumulation is visible between the two pleats 18.3 and 18.4, in the pleat trough 24.4, which has an effect on the bending behavior of the boot 10.

The positions of the lug-shaped projections 50.1 and 50.2 lying opposite one another in pairs can also be readily seen in FIG. 3, as well as the reinforcement ribs 60.1, 60.2, 60.3 located the outer grooves 52 and 54, in the form of annular grooves, wherein the reinforcement ribs that are opposite one another in pairs in the two outer grooves 52 and 54 have the same reference symbol, because they are identical.

Figure 4:
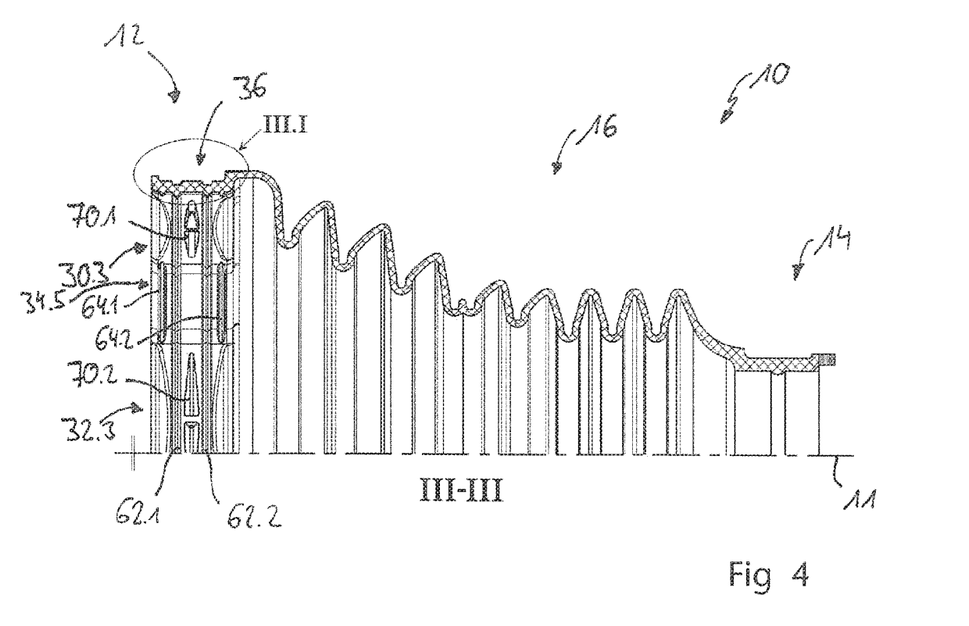
FIG. 4: shows a sectional view cut along the section shown in FIG. 2.

FIG. 4 shows a section indicated in FIG. 2, which passes through the connecting regions 34.3 and 34.6, which are thinner in the first fastening region 12. The pleated region 16 described above in reference to FIG. 3 can be readily identified therein. The inner groove segments 70.1 and 70.2 of the inner groove can be readily seen in the first fastening region 12, which are located between two circumferential annular sealing lips 62.1 and 62.2. The two positioning ribs 64.1 and 64.2 can be seen in the connecting region 34.5, which extend substantially over the entire length of the connecting region 34.5. The inner groove segments 70.1 and 70.2 of the inner groove are located in the lobe region 30.3 and the guide region 32.3.

Figure 5:
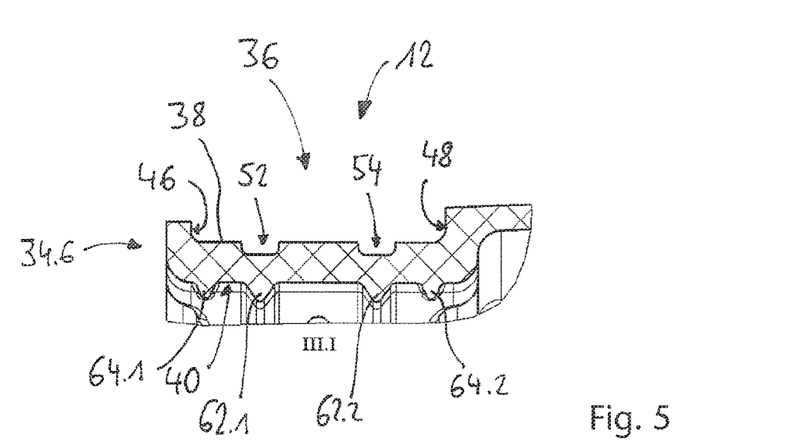
FIG. 5: shows a detail III.I of FIG. 4 regarding the design of the connecting region.

FIG. 5 shows the detail III.I in FIG. 4 relating to a section through the connecting region 34.6. It can be seen therein that the two outer grooves 52 and 54 are also formed there, and are also formed as shallow circumferential annular grooves. In particular, they are not parabolic. The outer grooves 52 and 54 can, however, be parabolic in the connecting regions, if as they are formed as circumferential annular grooves.

The sealing lips 62.1 and 62.2 are located on the undersurface 40 lying opposite the outer grooves 52 and 54, which have a substantially triangular cross section profile. These are located between the positioning ribs 64.1 and 64.2, which have a different cross section profile than the sealing lips 62.1 and 62.2. In particular, the positioning ribs 64.1 and 64.2 are not as high, and their exposed triangular peaks are more rounded than the sealing lips 62.1 and the 62.3. The connector seat region 38 is also shown in FIG. 5, which is defined by an outer boundary wall 46 and an inner boundary wall 48, with the connector seat region surface 38 extending between them.

FIG. 6 shows the section II-II indicated in FIG. 2 that passes through the first fastening region 12, the guide region 32.1 thereof, and the lobe region 30.2 thereof. The section thus passes directly through the reinforcement ribs 60.1 and 60.4 with a radial orientation, as can be readily seen in the detail shown in FIG. 7a with regard to the guide region 32.1 and in the detail shown in FIG. 7b with regard to the lobe region 30.2. The outer grooves 52 and 54 are also shallower there, in relation to a depth in the connecting regions 34.1 to 34.6, as can be seen in FIG. 5. The at least two outer grooves are thus not necessarily parabolic, as set forth in the present disclosure, in the region of the reinforcement ribs, if there are any.

It can be seen in FIG. 6 that there are recesses 31.1 and 31.2 on both sides of the lobe region 70.3 as well as the guide region 32.3. The material of the first fastening region 12 is thus reduced in these regions. This improves the seal when a connector, not shown, is fastened thereto. Recesses 31 can be provided on both sides, lying opposite one another in the first fastening region 12, in the lob regions 30 and/or in the guide regions 32.

Furthermore, the inner groove segment 70.1 in the lobe region 30.3 and the inner groove segment 70.2 in the guide region 32.2, each of which has reinforcement ribs 74.1 or 74.2, respectively, in the middle, with a radial orientation, can be seen in FIG. 6. As set forth in the present disclosure, the length of the inner groove segments 70.1 and 70.2 is substantially the same as or slightly less than the length of the lobe region 30 and/or the guide region 32.

Figure 7A:
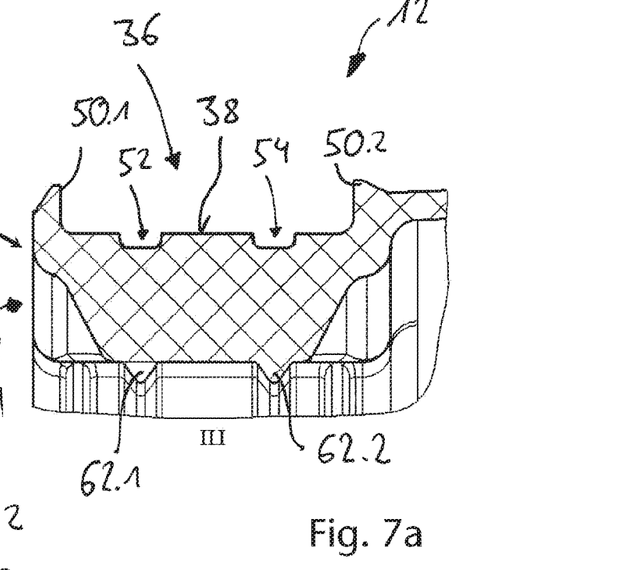
FIG. 7a: shows a detail II.I regarding a guide region of the first example of the boot.
Figure 8A:
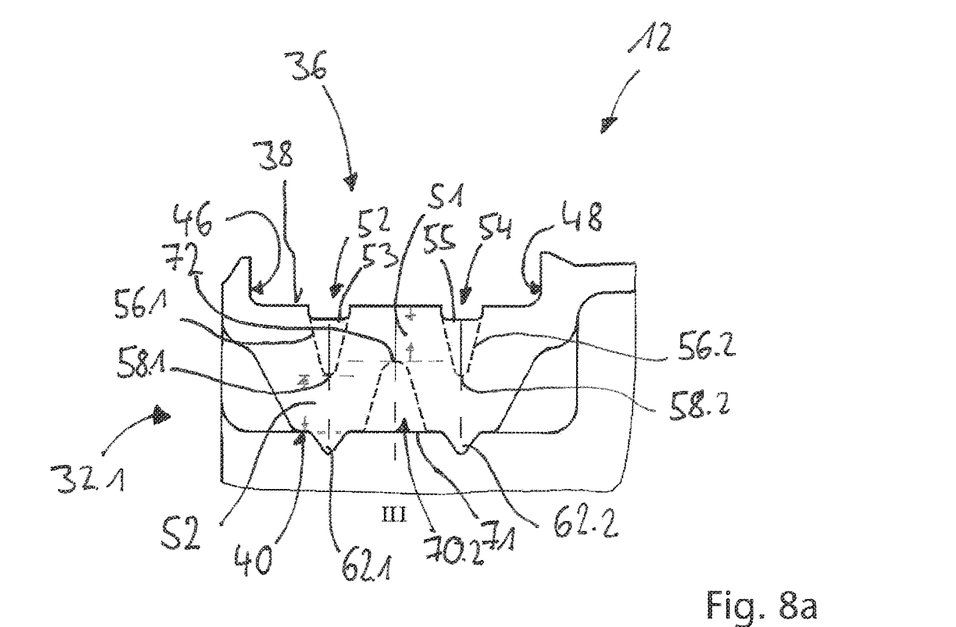
FIG. 8a: shows the detail shown in FIG. 7a, illustrating the locations of the inner grooves and the outer grooves in the guide region.

FIG. 8a shows the guide region 32.1 shown in FIG. 7a illustrating the course of the two outer grooves 52 and 54 as well as the inner groove segment 70.2, wherein the two outer grooves 52 and 54 and the inner groove segment 70.2 are indicated by broken lines. The parabolic design of the outer grooves 52 and 54 and the inner groove segment 70.2 can be readily seen. A material thickness S2 can be determined from a groove base 58.1 or 58.2 of the two outer grooves 52 and 54, respectively, in relation to the undersurface 40 of the first fastening region 12. A material thickness S1 can likewise be determined between a groove base 72 of the inner groove segment 70.2 and the connector seat region surface 38 of the connector seat region 36. The outer groove 52 has a base 53, and the outer groove 54 has a base 55, which correspond to the cross sectional widths of the openings thereof toward the connector seat region surface 38. The inner groove segment 70.2 has a base 71, which corresponds to the cross sectional width of the opening thereof toward the undersurface 40 of the first fastening region 12. The base 71 of the inner groove segment 70.2 is therefore significantly wider, approximately 70% wider, than the base 53 or 54 of the outer grooves 52 and 54, respectively. In contrast, the depths of the outer grooves 52 and 54, and the inner groove segment 70.2 are approximately the same. The outer grooves 52 and 54 have parabolic groove walls 56.1 and 56.2.

Figure 7B:
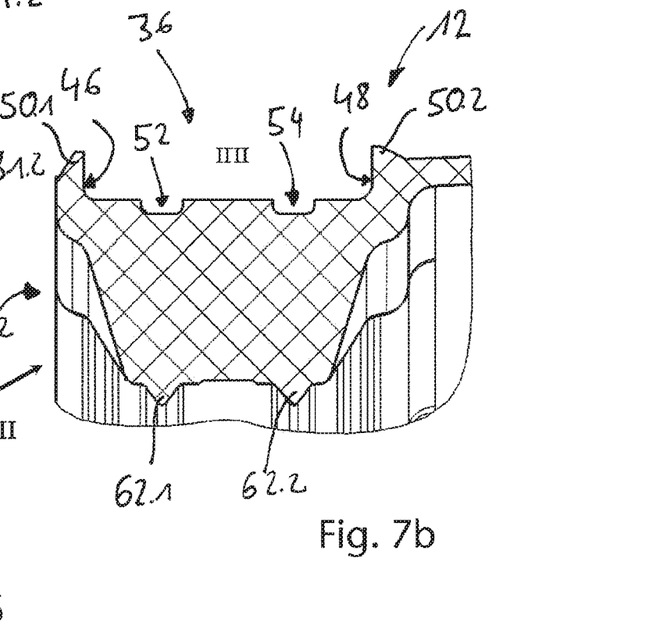
FIG. 7b: shows a detail II.II regarding a lobe region of the first example of the boot.
Figure 8B:
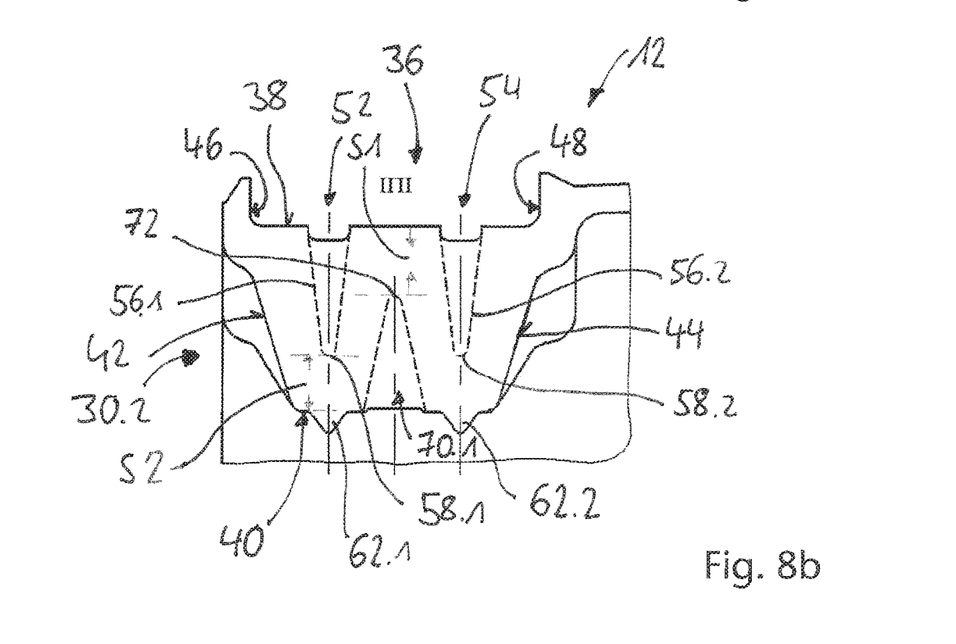
FIG. 8b: shows the detail shown in FIG. 7b, illustrating the locations of the inner and outer grooves in the lobe region.

FIG. 8b shows the detail indicated in FIG. 7b, illustrating the locations of the two outer grooves 52 and 54 and the inner groove segment 70.1 with broken lines. As in FIG. 8a, a material thickness S1 in relation to the inner groove 70.1, and S2 in relation to the two outer grooves 52 and 54 can be determined. The material thickness S1 and S2 are basically the same. The material thicknesses S2 are approximately the same as in the guide region 32.1 shown in FIG. 8a. The thicknesses S1 in the lobe region 30.2 and the guide region 32.1 shown in FIG. 8a are likewise approximately the same. In addition, the material thicknesses of the first fastening region 12 between an outer wall 42 thereof and a directly adjacent part of the groove wall 56.1 facing it, and between an inner wall 44 and a portion of the groove wall 56.2 facing it are substantially the same at approximately half of height of the outer grooves 52 and 54. Consequently, deflection of forces acting thereon as a result of attaching a connecter thereto, not shown herein, is improved.

A boot intended for installation on a tri-lobed joint housing is made available by the disclosure, which exhibits improved and good sealing properties, and also acts to prevent possible breakage of connectors.

The invention claimed is:

1. A boot, comprising:
a first fastening region, a second fastening region, and a pleated region between the first fastening region and the second fastening region;
wherein the first fastening region includes connecting regions, at least one of lobe regions or guide regions, and a connector seat region that has a connector seat region surface and an opposing undersurface, wherein there is at least one inner groove located on the undersurface in the lobe regions or in the guide regions;
wherein a depth of the at least one inner groove increases in the lobe regions or in the guide regions toward a middle of the lobe regions or the guide regions.

2. The boot according to claim 1, wherein a material thickness of the connector seat region, determined between the connector seat region surface and a groove base of the at least one inner groove is substantially the same in the lobe regions or in the guide regions.

3. The boot according to claim 1, wherein, in a cross section, defined by a plane comprising a main axis of the boot and passing through the first fastening region and the second fastening region, either (1) the at least one inner groove has a substantially parabolic form in the lobe regions or in the guide regions, or (2) there are at least two substantially parallel outer grooves in the lobe regions or in the guide regions, starting from the connector seat region surface, and the at least two outer grooves have a substantially parabolic form in the lobe regions or in the guide regions.

4. The boot according to claim 1, wherein either (1) the at least one inner groove has different depths in the lobe regions or in the guide regions, or (2) there are at least two substantially parallel outer grooves in the lobe regions or in the guide regions, starting from the connector seat region surface, and the at least two outer grooves have different depths in the lobe regions or in the guide regions.

5. The boot according to claim 1, wherein either (1) the depths of the at least one inner groove increase in the lobe regions or in the guide regions toward the middle of the lobe regions or the guide regions, or (2) there are at least two substantially parallel outer grooves in the lobe regions or in the guide regions, starting from the connector seat region surface, and the at least two outer grooves increase in the lobe regions or in the guide regions toward the middle of the lobe regions or the guide regions.

6. The boot according to claim 1, wherein either (1) there is at least one reinforcement rib in the at least one inner groove or (2) there are at least two substantially parallel outer grooves in the lobe regions or in the guide regions, starting from the connector seat region surface, and there is at least one reinforcement rib in the at least two outer grooves.

7. The boot according to claim 6, wherein at least one of the reinforcement ribs has a radial orientation.

8. The boot according claim 7, wherein the cross section profiles of the at least two sealing lips and the two positioning ribs differ from one another.

9. The boot according to claim 6, wherein at least one of the reinforcement ribs is formed at an angle to a radial orientation of the boot.

10. The boot according to claim 1, wherein either (1) the at least one inner groove forms annular grooves, or (2) there are at least two substantially parallel outer grooves in the lobe regions or in the guide regions, starting from the connector seat region surface, and the at least two outer grooves form annular grooves.

11. The boot according to claim 1, wherein there are at least two substantially parallel outer grooves in the lobe regions or in the guide regions, the at least one inner groove is located in the lobe regions and in the guide regions, and the at least two outer grooves form annular grooves.

12. The boot according to claim 1, wherein either (1) the at least one inner groove is located in the lobe regions and in the guide regions, or (2) there are at least two substantially parallel outer grooves in the lobe regions or in the guide regions, starting from the connector seat region surface, and the at least two outer grooves are located in the lobe regions and in the guide regions.

13. The boot according to claim 1, wherein the at least one inner groove is located substantially in the middle of the cross section of the first fastening region in the connector seat region.

14. The boot according to claim 1, wherein there are at least two substantially parallel outer grooves in the lobe regions or in the guide regions, and a material thickness of the first fastening region beneath the at least two outer grooves is substantially the same between their groove bases and the undersurface of the first fastening region in the lobe regions or in the guide regions.

15. The boot according to claim 1, wherein there are at least two sealing lips located on the undersurface of the first fastening region.

16. The boot according to claim 15, wherein there are at least two substantially parallel outer grooves in the lobe regions or in the guide regions, and the at least two sealing lips are located substantially beneath the at least two outer grooves, at least in the lobe regions or in the guide regions.

17. The boot according to claim 1, wherein there are two positioning ribs on the undersurface in the connecting regions.

18. The boot according to claim 17, wherein the at least two sealing lips are located between the positioning ribs.

19. A boot, comprising:
a first fastening region, a second fastening region, and a pleated region between the first fastening region and the second fastening region;
wherein the first fastening region includes connecting regions, lobe regions, and a connector seat region that has a connector seat region surface and an opposing undersurface, wherein there are at least two substantially parallel outer grooves in the lobe regions or in the guide regions, starting from the connector seat region surface; and
wherein depths of the at least two outer grooves increase in the lobe regions toward a middle of the lobe regions.

20. A boot, comprising:
a first fastening region, a second fastening region, and a pleated region between the first fastening region and the second fastening region;
wherein the first fastening region includes connecting regions, guide regions, and a connector seat region that has a connector seat region surface and an opposing undersurface, wherein there are at least two substantially parallel outer grooves in the lobe regions or in the guide regions, starting from the connector seat region surface; and
wherein depths of the at least two outer grooves increase in the guide regions toward a middle of the guide regions.

\* \* \* \* \*

UNITED STATES PATENT AND TRADEMARK OFFICE
CERTIFICATE OF CORRECTION

| | |
|---|---|
| PATENT NO. | : 11,226,011 B2 |
| APPLICATION NO. | : 16/475775 |
| DATED | : January 18, 2022 |
| INVENTOR(S) | : Markus Deisinger and Joachim Wette |

It is certified that error appears in the above-identified patent and that said Letters Patent is hereby corrected as shown below:

On the Title Page

Delete the title page and substitute therefore with the attached title page.

In the Claims

Replace Column 12, Line 11 through Column 14, Line 37 with the below Claims 1-22:
--1. A boot, comprising:
a first fastening region, a second fastening region, and a pleated region between the first fastening region and the second fastening region;
wherein the first fastening region includes connecting regions, at least one of lobe regions or guide regions, and a connector seat region that has a connector seat region surface and an opposing undersurface, wherein there is at least one inner groove located on the undersurface in the lobe regions or in the guide regions;
wherein a depth of the at least one inner groove increases in the lobe regions or in the guide regions toward a middle of the lobe regions or the guide regions.

2. The boot according to claim 1, wherein a material thickness of the connector seat region, determined between the connector seat region surface and a groove base of the at least one inner groove is substantially the same in the lobe regions or in the guide regions.

3. The boot according to claim 1, wherein, in a cross section, defined by a plane comprising a main axis of the boot and passing through the first fastening region and the second fastening region, either (1) the at least one inner groove has a substantially parabolic form in the lobe regions or in the guide regions, or (2) there are at least two substantially parallel outer grooves in the lobe regions or in the guide regions, starting from the connector seat region surface, and the at least two outer grooves have a substantially parabolic form in the lobe regions or in the guide regions.

4. The boot according to claim 1, wherein either (1) the at least one inner groove has different depths in the lobe regions or in the guide regions, or (2) there are at least two substantially parallel outer Signed and Sealed this
Thirty-first Day of May, 2022

*Katherine Kelly Vidal*

Katherine Kelly Vidal
*Director of the United States Patent and Trademark Office* grooves in the lobe regions or in the guide regions, starting from the connector seat region surface, and the at least two outer grooves have different depths in the lobe regions or in the guide regions.

5. The boot according to claim 1, wherein either (1) the depths of the at least one inner groove increase in the lobe regions or in the guide regions toward the middle of the lobe regions or the guide regions, or (2) there are at least two substantially parallel outer grooves in the lobe regions or in the guide regions, starting from the connector seat region surface, and the at least two outer grooves increase in the lobe regions or in the guide regions toward the middle of the lobe regions or the guide regions.

6. The boot according to claim 1, wherein either (1) there is at least one reinforcement rib in the at least one inner groove, or (2) there are at least two substantially parallel outer grooves in the lobe regions or in the guide regions, starting from the connector seat region surface, and there is at least one reinforcement rib in the at least two outer grooves.

7. The boot according to claim 6, wherein at least one of the reinforcement ribs has a radial orientation.

8. The boot according claim 7, wherein the cross section profiles of the at least two sealing lips and the two positioning ribs differ from one another.

9. The boot according to claim 6, wherein at least one of the reinforcement ribs is formed at an angle to a radial orientation of the boot.

10. The boot according to claim 1, wherein either (1) the at least one inner groove forms annular grooves, or (2) there are at least two substantially parallel outer grooves in the lobe regions or in the guide regions, starting from the connector seat region surface, and the at least two outer grooves form annular grooves.

11. The boot according to claim 1, wherein there are at least two substantially parallel outer grooves in the lobe regions or in the guide regions, the at least one inner groove is located in the lobe regions and in the guide regions, and the at least two outer grooves form annular grooves.

12. The boot according to claim 1, wherein either (1) the at least one inner groove is located in the lobe regions and in the guide regions, or (2) there are at least two substantially parallel outer grooves in the lobe regions or in the guide regions, starting from the connector seat region surface, and the at least two outer grooves are located in the lobe regions and in the guide regions.

13. The boot according to claim 1, wherein the at least one inner groove is located substantially in the middle of the cross section of the first fastening region in the connector seat region.

14. The boot according to claim 1, wherein there are at least two substantially parallel outer grooves in the lobe regions or in the guide regions, and a material thickness of the first fastening region beneath the at least two outer grooves is substantially the same between their groove bases and the undersurface of the first fastening region in the lobe regions or in the guide regions.
15. The boot according to claim 1, wherein there are at least two sealing lips located on the undersurface of the first fastening region.

16. The boot according to claim 15, wherein there are at least two substantially parallel outer grooves in the lobe regions or in the guide regions, and the at least two sealing lips are located substantially beneath the at least two outer grooves, at least in the lobe regions or in the guide regions.

17. The boot according to claim 1, wherein there are two positioning ribs on the undersurface in the connecting regions.

18. The boot according to claim 17, wherein the at least two sealing lips are located between the positioning ribs.

19. The boot according to claim 1, wherein there are at least two substantially parallel outer grooves in the lobe regions or in the guide regions, starting from the connector seat region surface.

20. The boot according to claim 19, wherein the at least one inner groove located on the undersurface of the first connector seat region is located between the at least two outer grooves starting at the connector seat region surface, when seen in a cross section.

21. A boot, comprising:
a first fastening region, a second fastening region, and a pleated region between the first fastening region and the second fastening region;
wherein the first fastening region includes connecting regions, lobe regions, and a connector seat region that has a connector seat region surface and an opposing undersurface, wherein there are at least two substantially parallel outer grooves in the lobe regions or in the guide regions, starting from the connector seat region surface; and
wherein depths of the at least two outer grooves increase in the lobe regions toward a middle of the lobe regions.

22. A boot, comprising:
a first fastening region, a second fastening region, and a pleated region between the first fastening region and the second fastening region;
wherein the first fastening region includes connecting regions, guide regions, and a connector seat region that has a connector seat region surface and an opposing undersurface, wherein there are at least two substantially parallel outer grooves in the lobe regions or in the guide regions, starting from the connector seat region surface; and
wherein depths of the at least two outer grooves increase in the guide regions toward a middle of the guide regions.--.

(12) United States Patent
Deisinger et al.

(10) Patent No.: US 11,226,011 B2
(45) Date of Patent: Jan. 18, 2022

(54) BELLOWS COMPRISING AT LEAST ONE INTERNAL GROOVE

(71) Applicant: GKN Driveline International GmbH, Lohmar (DE)

(72) Inventors: Markus Deisinger, Siegburg (DE); Joachim Wette, Hennef (DE)

(73) Assignee: GKN Driveline International GmbH, Lohmar (DE)

(*) Notice: Subject to any disclaimer, the term of this patent is extended or adjusted under 35 U.S.C. 154(b) by 122 days.

(21) Appl. No.: 16/475,775

(22) PCT Filed: Jan. 11, 2017

(86) PCT No.: PCT/EP2017/050487
§ 371 (c)(1),
(2) Date: Jul. 3, 2019

(87) PCT Pub. No.: WO2018/130277
PCT Pub. Date: Jul. 19, 2018

(65) Prior Publication Data
US 2019/0353209 A1    Nov. 21, 2019

(51) Int. Cl.
*F16J 3/04* (2006.01)
*F16D 3/84* (2006.01)

(52) U.S. Cl.
CPC .............. *F16D 3/845* (2013.01); *F16J 3/042* (2013.01)

(58) Field of Classification Search
CPC ......... F16J 3/00; F16J 3/042; F16J 3/04; F16J 3/041; F16D 3/843; F16D 3/845

USPC .................................................. 277/391
See application file for complete search history.

(56) References Cited

U.S. PATENT DOCUMENTS

| 3,688,523 A | 9/1972 | Lutz |
| 6,547,669 B1* | 4/2003 | Neviani ............ F16J 3/042 464/175 |
| 7,056,219 B2 | 6/2006 | Toriumi et al. |
| 7,326,119 B2* | 2/2008 | Toriumi ............ F16J 3/042 464/175 |
| 7,967,687 B2 | 6/2011 | Yamamoto |

(Continued)

FOREIGN PATENT DOCUMENTS

| CN | 101398081 A | 4/2009 |
| DE | 10131302 A1 | 1/2003 |

(Continued)

OTHER PUBLICATIONS

International Search Report and Written Opinion for PCT/EP2017/050487 dated Oct. 17, 2017 (16 pages; with English translation).
(Continued)

*Primary Examiner* — Nathan Cumar
(74) *Attorney, Agent, or Firm* — Bejin Bieneman PLC (57) ABSTRACT

A boot is provided with an improved sealing effect. The boot has a first and a second fastening region, and a pleated region between them, wherein the first fastening region comprises lobe regions and/or guide regions, and connecting regions and a connector seat region that has a connector seat region surface and an undersurface lying opposite it, wherein there is at least one inner groove in the lobe regions and/or in the guide regions, on the undersurface.

22 Claims, 5 Drawing Sheets